United States Patent [19]

Weckler et al.

[11] 3,822,362

[45] July 2, 1974

[54] SELF-SCANNING PHOTO DIODE ARRAY

[75] Inventors: Gene P. Weckler, Campbell; Edward H. Snow, Los Altos, both of Calif.

[73] Assignee: Reticon Corporation, Mountain View, Calif.

[22] Filed: Mar. 19, 1973

[21] Appl. No.: 342,526

[52] U.S. Cl. ................ 178/7.1, 250/211 J, 250/578

[51] Int. Cl. ............................................ H04n 5/30

[58] Field of Search ....... 178/7.1, 7.3 D; 250/211 R, 250/211 J, 553, 220 M; 315/169 TU; 340/166 EL

[56] References Cited

UNITED STATES PATENTS

| | | | |
|---|---|---|---|
| 3,603,731 | 9/1971 | Weimer | 178/7.3 D |
| 3,696,393 | 10/1972 | McDonald | 178/7.3 D |
| 3,715,485 | 2/1973 | Weimer | 178/7.1 |
| 3,717,770 | 2/1973 | Dyck et al. | 250/211 J |

OTHER PUBLICATIONS

Weimer et al., Self-Scanned Image Sensors Based on Charge Transfer by the Bucket-Brigade Method-IEEF Trans. on Elect Devices, Vol. ED-18, No. 11 (Nov., 1971).

*Primary Examiner*—Robert L. Richardson
*Assistant Examiner*—Mitchell Saffian
*Attorney, Agent, or Firm*—Spensley, Horn & Lubitz

[57] ABSTRACT

An improved self-scanning photo-diode array is disclosed which utilizes a shift counter as a scan generator. The high level clocking signals and start signal used by the scan generator are generated on the same chip which includes the diode array from an externally provided low level timing signal. The symmetry of the array eliminates much of the noise associated with switching transients present in prior art devices.

16 Claims, 3 Drawing Figures

SELF-SCANNING PHOTO DIODE ARRAY

BACKGROUND OF THE INVENTION

1. Field of the Invention

The invention relates to the field of self-scanning photo-sensitive arrays.

2. Description of the Prior Art

In prior art self-scanning photo-sensor arrays such as photo-transistors or photo diode arrays shift registers are utilized as scan generators for sequentially coupling each of the photo-transistors or photo-diodes in the array to a video output line. Each scan is initiated by the application of a start signal (a data bit) to the shift register. One problem which is sometimes encountered with such scan generators is that an extra start signal is inadvertently placed into the shift register while the shift register is still scanning. Under these conditions, several photo-transistors or photo-diodes are sampled at any given time and the video output signal is meaningless. The present invention solves this problem by converting the shift register into a shift counter by the use of a NOR gate and other logic circuitry.

In many self-scanning photo-sensor arrays, a scan generator is positioned on a semiconductor chip parallel to the row of photo-sensors such as photo-diodes or photo-transistors. Each photo-sensor is accessed in sequence by an adjacent stage of the scan generator. One problem in such devices is referred to as fixed pattern noise and results from switching transients associated with the shift registers which are typically driven by two or more phase clock signals. In the simplest case of a two-phase clock (phases $\phi_1$ and $\phi_2$), one photo-diode is accessed when $\phi_1$ is negative and the next when $\phi_2$ is negative. Thus, an odd-even pattern will be present in the fixed pattern noise unless there is absolute symmetry between the clock lines for $\phi_1$ and $\phi_2$ and between adjacent stages in the shift register. In prior art devices, this was impossible to achieve, since the shift registers ran along one side of the photo array making it necessary that one of the clock lines be further from the array than the other. Additionally, when efforts are made to increase photo-diode density, the shift register stages are often staggered so that alternate states are further from the photo-diodes and, therefore, have longer interconnecting lines with more capacitance which further prevented symmetrical operation of the array.

The present invention solves these problems and provides near absolute symmetry between adjacent stages of the shift counters and between the $\phi_1$ and $\phi_2$ clock lines. This is accomplished by placing the odd stages of the shift counter along one side of the array and the even stages along the other side of the array so that only one clock line is required on each side of the array. Interconnection between the odd stages and even stages of the scan generator is accomplished by running interconnecting lines across the array between the photo-diodes in the array.

In prior art self-scanning arrays the high level clocking signals used by the scan generator are typically externally generated and applied to the chip which includes the photo-diode or photo-transistor array. This results in several disadvantages, among them the fact that it was more difficult to properly balance a multi-phase clock signal, and the imbalances in such clocking signals result in poorer signal to noise ratio in the video output. Additionally, it is accepted that the reliability of a complex integrated circuit depends more on the complexity of its interface than its own complexity. Hence, the incorporation of the peripheral functions onto the self-scanning photo-diode or photo-transistor array will improve the reliability of such an array. In the present invention the high level multi-phase clock signals and the start signal are generated on the same monolithic silicon chip which includes the scan generators and photo-diode arrays.

BRIEF SUMMARY OF THE INVENTION

An improved self-scanning photo-diode array is disclosed which utilizes shift counters as scan generators. A NOR gate is disposed between a shift register and a photo-diode array to sense the condition when no signal exists in the shift register. This event is utilized to prevent the inadvertent loading of a second start signal into the shift register when the array is being scanned. A low level clocking signal is applied to the chip which includes the array and the scan generator. This low level signal is converted into two high level clocking signals by the use of a bi-stable circuit and a pair of power buffers. Additionally, another bi-stable circuit is utilized in conjunction with the first mentioned bi-stable circuit in order to generate a start signal for the scan generator. In the presently preferred embodiment of the array, the odd numbered stages of the scan generator are disposed along one side of the array while the even numbered stages of the scan generator are disposed along the other side of the array. Interconnecting lines are disposed between the photo-diodes of the array such that the odd numbered and even numbered stages of the scan generator are interconnected. With this symmetry the switching transients associated with prior art devices is greatly reduced resulting in video-output signal having a better signal to noise ratio. The array also includes a plurality of switches disposed between each of the NOR gates and the photo-diodes in the array. These switches permit the termination of a scan at any desired time hence permitting only a predetermined number of diodes in the photo-diode array to be scanned.

DESCRIPTION OF THE DRAWINGS

The following is a brief description of the drawings.

DESCRIPTION OF THE PREFERRED EMBODIMENTS

Self-scanning photo-detection arrays which utilize solid state photo-sensitive devices are well known in the art. Among these devices are photo-transistors and photo-diodes which operate in a storage mode. These devices, when operated in the storage mode with a junction reverse biased, have a characteristic of a capacitor with a parallel current source. When the junction is open-circuited, the junction slowly discharges as electrons and holes are generated thermally and neutralize the stored charge on each side of the junction. With the application of light to the junction the discharge of the junction occurs much more rapdily and hence the junction may be used to sense light. Typically, the junction is recharged periodically and the recharging current is sensed; this current is a function of the total incident light on the junction. Such charge storage devices may be fabricated utilizing metal-oxide-semiconductor (MOS) technology. For a general discussion of such devices see "Charge Storage Lights The Way For Solid State Image Sensors" by G. P. Weckler, *Electronics*, May 1, 1967, pages 75 to 78. In the presently preferred embodiment of the invention described herein, photo-diodes operated in the storage mode and fabricated utilizing MOS technology are utilized. It will be apparent to one of ordinary skill in the art that other photo-sensitive devices may be utilized in lieu of the photo-diodes described herein.

Figure 1:
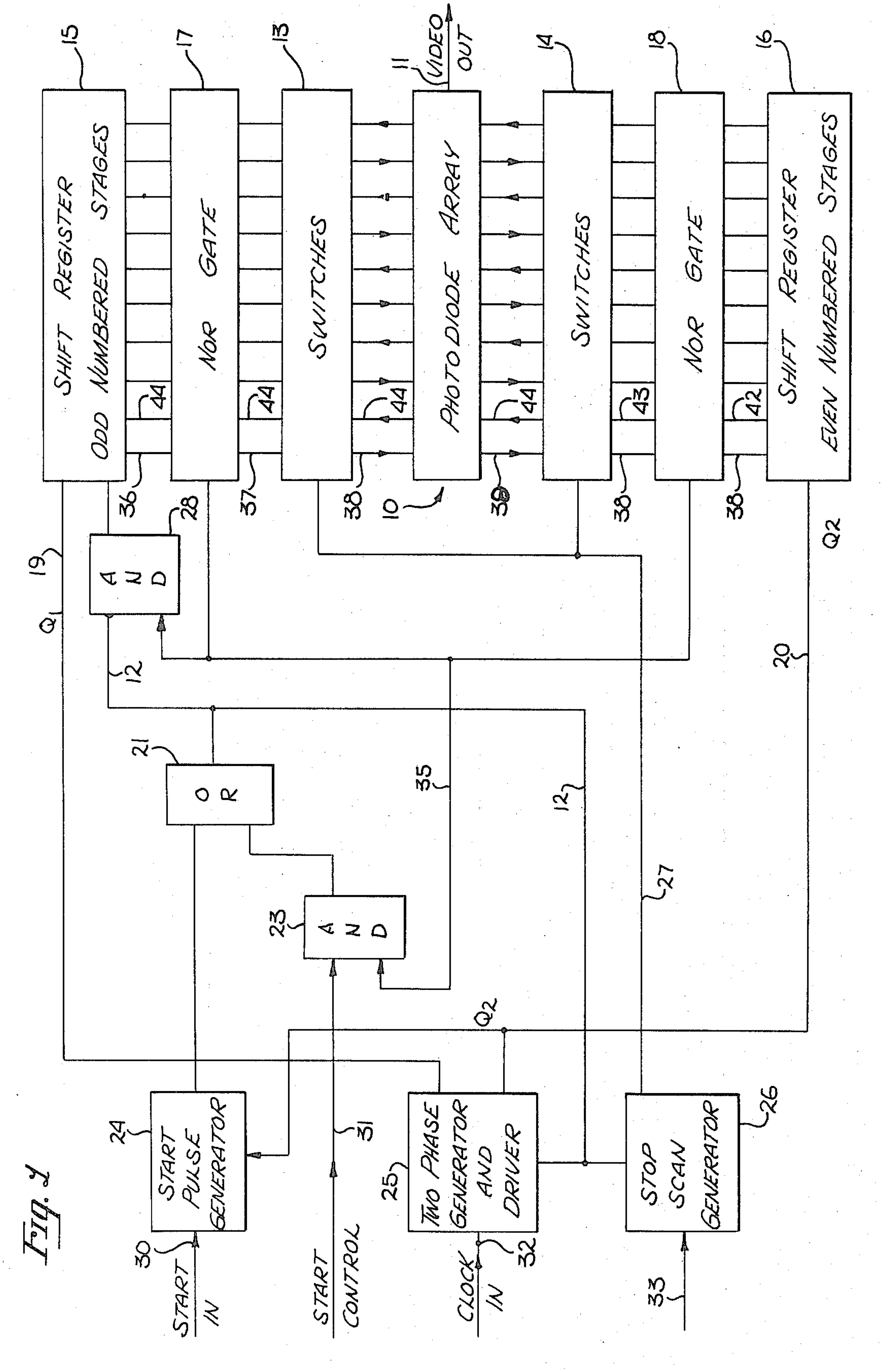
FIG. 1 is a block diagram illustrating a self-scanning photo-diode array built in accordance with the present invention.

Referring to FIG. 1 and the self-scanning array illustrated therein, the inputs to the array include a "start in" signal coupled to start pulse generator 24 by a lead 30 and a "start control" signal coupled to AND gate 23 by a lead 31. As will be seen, the "start control" signal when applied to lead 31 enables the photo-diode array 10 to be continually scanned since start signals are internally generated and are coupled to shift register 15 via lead 12 from OR gate 21. When no "start control" signal is applied to lead 31, the photo-diode array 10 may be made to scan upon receipt of "start in" signals on lead 30.

An additional input to the array of FIG. 1 is a "clock in" signal supplied to the two-phase generator and driver 25 on lead 32. In the presently preferred embodiment this signal comprises periodic pulses having a relatively low amplitude, for example, approximately 5 volts. This signal is utilized to generate the two-phase timing signals $\phi_1$ and $\phi_2$ which are coupled from the two-phase generator and driver 25 to shift register 15 and to shift register 16 via lines 19 and 20, respectively. In addition signal $\phi_2$ is coupled to start pulse generator 24 for resetting said generator. A signal to halt or terminate the scan, particularly before an entire scan is completed, is applied to the stop scan generator 26 via lead 33, as will be discussed in more detail herein. The output from the array is a video output signal produced from the photo-diode array 10 on lead 11.

The photo-diode array 10 may comprise any photo sensor devices but, as previously mentioned in the presently preferred embodiment, the photo-diode array 10 comprises MOS photo-diodes or other such devices or transistors. The array 10 may comprise any number of such devices disposed in a row one along side the other as is commonly done on the art.

The scan generation function for the photo-diode array 10 is performed by shift register 15 and shift register 16 (which may be a single shift register). Shift register 15 includes the odd numbered stages of a shift register while shift register 16 includes the even numbered stages. The manner in which the stages are connected to the photo-diodes will be explained in more detail in conjunction with FIG. 3. Shift register 15 and 16 may be ordinary shift registers which in the presently preferred embodiment comprises MOS field effect transistors (FET). As illustrated schematically in FIG. 1, shift registers 15 and 16 are disposed on opposite sides of the photo-diode array 10. Actually, shift registers 15 and 16 comprise a single shift register with the odd numbered stages being shift register portion 15 and the even numbered stages being shift register portion 16. A NOR gate 17 and a plurality of switches 13 are disposed between one side of photo-diode 10 and shift register 15. Likewise, NOR gate 18 and a plurality of switches 14 are disposed between the other side of the photo-diodes 10 and shift register 16.

The NOR gate 17 may include an ordinary NOR gate such as those commonly utilized in the digital art which in the presently preferred embodiment includes a NOR gate which utilize MOS-FETs. NOR gate 18, which is coupled to shift register 16 is substantially the same manner as NOR gate 17 is coupled to shift register 15, may be identical to NOR gate 17 and is coupled to lead 35 as is NOR gate 17. NOR gates 17 and 18 serve the function of providing a signal on lead 35 when no signal exists within shift registers 15 and 16. Thus, as will be explained more fully in conjunction with FIG. 2, the NOR gates in conjunction with the shift registers convert the shift registers into shift counters and in cooperation with AND gate 28, prevent a second start signal from being applied to shift register 15 when the photo-diode array 10 is being scanned.

A plurality of switches 13 are disposed between NOR gate 17 and the array 10 and likewise a plurality of switches 14 are disposed between the NOR gate 18 and the other side of array 10. Switches 13 and 14, which may be identical, each comprise a plurality of normally off MOS switches coupled to lead 27. These switches permit the leads interconnecting the NOR gates 17 and 18 with the photo-diode 10 to be selectively coupled to ground upon receipt of a signal on lead 27. Thus, when a signal is applied on lead 27, the leads interconnecting the NOR gates 17 and 18 with the photo-diode array 10 are immediately coupled to ground. This, of course, terminates the scan, and, as will be seen, permits the scan to be terminated at any desired time.

The NOR gates 17 and 18 are coupled by lead 35 to one input terminal of AND gate 23 and AND gate 28. The other input terminal to AND gate 23 is coupled to the start control lead 31. The output from AND gate 23 is coupled to one of the input terminals of OR gate 21 which in turn is coupled to AND gate 28. The other input terminal to OR gate 21 is coupled to the output from the start pulse generator 24. The output from OR gate 21 is coupled by a lead 12 to AND gate 28 which in turn is coupled to shift register 15. The stop scan generator 26 is also coupled to AND gate 28. This connection of line 12 to Driver 25 and Stop scan generator 26, when a start pulse appears on line 12, resets Driver 25 (e.g., to $\phi$ negative) to loading of the first stage in register 15. It also resets stop scan generator 26 in the event the scan had been prematurely terminated by pulsing stop scan generator 33. The AND gates 23 and 28 and the OR gate 21 may be ordinary logic elements known in the art. In the presently preferred embodiment these devices are constructed from MOS-FETs.

The start pulse generator 24 and the two-phase generator and driver 25 will be discussed in more detail in conjunction with FIG. 3. These devices in the presently preferred embodiment are also constructed from MOS- FET circuitry. In the presently preferred embodiment, the start pulse generator 24, the two-phase generator and driver 25, the stop scan generator 26, the AND gates 22 and 23, the OR gate 21, the shift registers 15 and 16, NOR gate 17 and 18, switches 13 and 14 and the photo-diode array 10 are all fabricated on a single-silicon chip utilizing MOS technology. The inclusion of all of these devices on the same chip results in substantial improvements in performance of the electronic-optical system.

Figure 2:
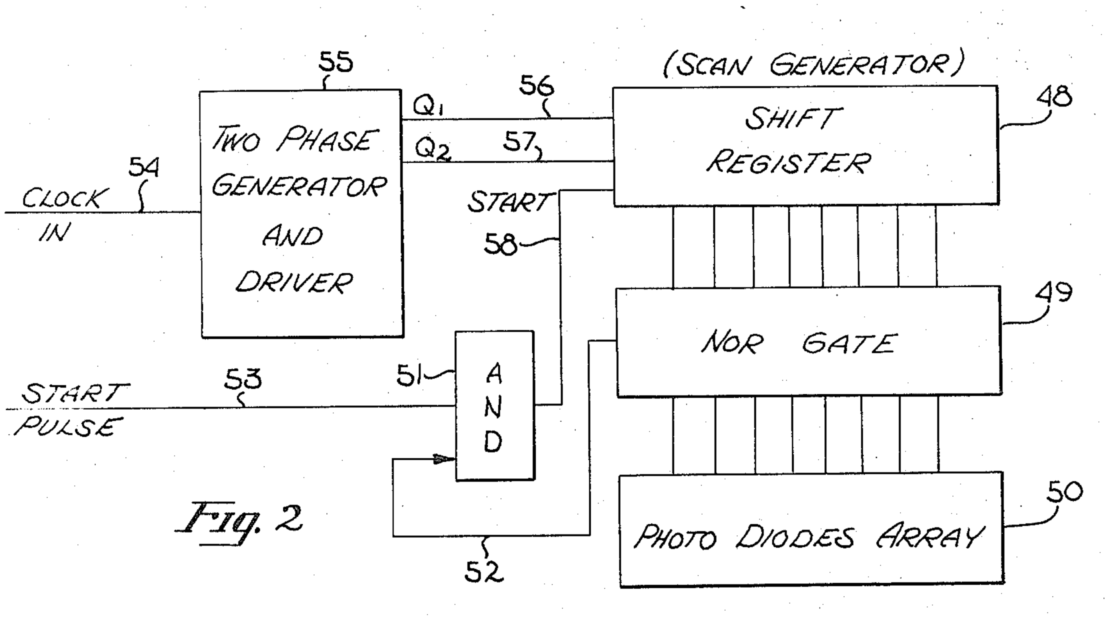
FIG. 2 is a block diagram of a self-scanning photo-diode array which illustrates the presently preferred embodiment for converting the shift register utilized in prior art scan generators to a shift counter as taught by the present invention.

The method by which the NOR gates 17 and 18 and the shift registers 15 and 16 operate as shift counters and prevent the introduction of a new start signal into shift register 15 when a scan is in process can readily be understood by reference to FIG. 2. Referring to FIG. 2, a shift register 48 is illustrated coupled to a NOR gate 49; the NOR gate 49 is coupled to a photo-diode array 50. For the sake of simplicity, a single shift register 48 is illustrated in FIG. 2. This register is driven by a pair of timing signals $\phi_1$ and $\phi_2$ coupled to the register on leads 56 and 57, respectively. (It should be understood that shift register 48 comprises shift register 15 and 16 of FIG. 1). These timing signals are generated by the two-phase generator and driver 55 which may comprise generator and driver 25 of FIG. 1. An input clock signal such as the signal applied to the array of FIG. 1 on lead 32, is applied on lead 54 to generator and driver 55. One input terminal of AND gate 51 (such as AND gate 28 of FIG. 1) is coupled by lead 53 to a start pules (e.g., start in or start control) such as applied to lead 33 of FIG. 1 and the other terminal of AND gate 51 is coupled to NOR gate 49 by lead 52. The start pulse can only pass through gate 51 after shift register 48 and NOR gate 49 are clear. A "one" signal from the NOR gate 49 via lead 52 represents that a bit has cleared register 48, that is there is no bit or signal therein. The "one" output from the AND gate 51 is the start signal (a data bit) which is coupled to the shift register 48. With the exception of the first stage of the shift register, the NOR gate 49 (which is similar to the NOR gate 17 or 18 of FIG. 1) is coupled to each of the stages of the shift register and detects the condition of no bit ("zero") being present in the shift register 48. When a "zero" exist in all stages connected to the NOR gate 49, the output therefrom becomes a "one". A bit is transferred into the shift register 48 only when both $\phi_1$ on line 56 and the "start" signal on lead 58 are at a "one" or low state. A bit is transferred from the first stage to the second stage of shift register 48 when $\phi_2$ becomes a "one." The transfer of the "bit" to the second stage results in the NOR gate 49 and having a "zero" output which prevents further "bit" entry.

Assume for the purpose of explanation that a signal exists within the shift register 48 and a scan is occurring, that is, the photo-diode array 50 is being scanned. During the scan the timing signals which shift the bit from stage-to-stage of the shift register 48 are applied to register 48 by leads 56 and 57, these signals being synchronous with the clock in signal applied to the generator and driver 55 on lead 54. Since a signal exists within the shift register 48 during the scan, no output signal ("one") exists from NOR gate 49 on lead 52. Since no signal is present on lead 52, no output signal exists on lead 58 and no new bit may be loaded into shift register 48. When the scan is completed, that is, when no signal exists within shift register 48, a signal ("one") will appear on lead 52. When next a start pulse is supplied to AND gate 51, a start pulse (a data bit) will appear on lead 58. The start pulse, when coupled to the shift register 48, along with the "one" of clock signal $\phi_1$ will load a bit into the register and begin the next scan. Thus, with the circuitry of FIG. 2, it is readily apparent that a start signal will not be applied to shift register 48 so long as a signal exists within shift register 48, that is, so long as the photo-diode array 50 is being scanned.

Referring again to FIG. 1, the shift counter technique described in conjunction with FIG. 2, is utilized within FIG. 1. Assume first for the sake of explanation that a signal exists on lead 31. This signal is utilized to indicate that the array is to be self-starting, that is, it is to initiate a new scan upon completion of a prior scan without the need for a start signal on lead 30. When a signal appears on lead 35, the signal indicating that the scanning is completed and that no signals exist within shift registers 15 and 16, an output signal will appear on the output of AND gate 23 and will be communicated to the input of OR gate 21. The output signal of OR gate 21 is supplied to the input of AND gate 28 which results in an output signal being supplied to shift register 15. This signal on lead will initiate a new scan when a clock signal next appears on lead 32. The rate of the scan, of course, is synchronized by the clock timing signals $\phi_1$ and $\phi_2$.

If no signal exists on lead 31, the array will scan a single time each time an input signal is applied to lead 30. The input signal to lead 30 produces an output signal through the start pulse generator 24, which is synchronized with the $\phi_1$ signal and is coupled through the OR gate 21 to AND gate 28. AND gate 28 will prevent a scan from being initiated unless there is an input supplied thereto from the NOR gates which input indicates there are no bits in the registers. Thus, when no signal is present on lead 31, each scan is initiated by the application of a signal to lead 30.

Figure 3:
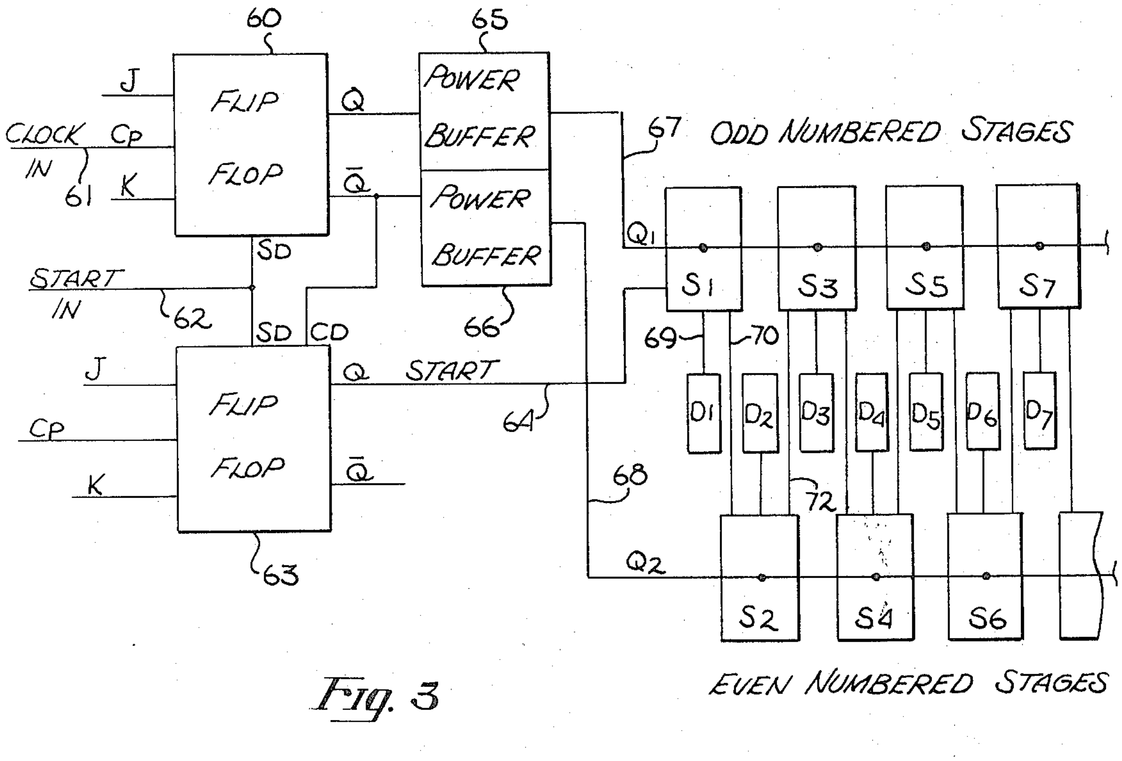
FIG. 3 is a block diagram of a self-scanning photo-diode array which illustrates the circuitry for generating the high level clocking signals and start signal in addition to the interconnections between the odd numbered stages and even numbered stages of the scan generator as taught by the present invention.

Referring to FIG. 3, a portion of the circuit of FIG. 1 is illustrated in more detail in order to describe the two-phase generator and driver 25, and the interconnections between shift registers 15 and 16 and the photo-diode array 10 of FIG. 1. In order to simplify the explanation, the NOR gates of FIG. 1 and the switches 13 and 14 of FIG. 1 have been deleted from the circuit of FIG. 3. In FIG. 3, the two-phase generator and driver 25 is illustrated as a bi-stable circuit, flip-flop 60, and a pair of power buffers 65 and 66. The flip-flop 60 which may be an ordinary flip-flop is constructed from MOS devices and has the input clock signal on lead 61 coupled to the $C_P$ terminal of flip-flop 60. The Q and $\overline{Q}$ outputs of the flip-flop 60 are coupled to the power buffers 65 and 66, respectively. The output from the buffers 65 and 66 are the $\phi_1$ signal (lead 67) and the $\phi_2$ signal (lead 68). The $\phi_1$ signal is coupled to the odd numbered stages $S_1$, $S_3$, $S_5$ , etc. of the scan generator while the $\phi_2$ signal is coupled to the even numbered stages of the scan generator $S_2$, $S_4$, $S_6$, etc. The input clock signal (lead 61) is divided by the flip-flop 60 so as to produce two out-of-phase clocking signals at the Q and $\overline{Q}$ terminals of flip-flop 60. These signals, after being buffered by power buffers 65 and 66, which may be ordinary buffers utilized for such purposes, provide the signals which permit a bit of information to be shifted from stage-to-stage of the scan generator. (This movement of the "bit" (signal) on the scan generator enables the photo-diode array 10 (FIG. 1) to be scanned). The start signal on lead 62 is applied to the $S_D$ terminal of both flip-flops 60 and 63, this signal is used to reset the flip-flops when a start signal is applied on lead 62. The flip-flop 63 performs the function of generating a start pulse such as the start pulse generated by generator 24 of FIG. 1. The start pulse is generated on the Q terminal the flip-flop which is coupled to the $S_1$ stage of the scan generator via lead 64. The $C_D$ terminal of flip-flop 63 is coupled to the $\bar{Q}$ terminal of flip-flop 60 to assure that the start signal is synchronized with the clocking pulses on leads 67 and 68. Thus, the start pulse generator 24 and the two-phase generator and driver 25 of FIG. 1 may be constructed utilizing a pair of flip-flops and a pair of power buffers. In the presently preferred embodiment, these curcuits are constructed utilizing MOS devices.

The shift register 15 of FIG. 1 is illustrated in FIG. 3 as sections $S_1$, $S_3$, $S_5$, and $S_7$ or the odd numbered stages of the shift register. Likewise, the shift register 16 is illustrated in FIG. 3 as stages $S_2$, $S_4$ and $S_6$ or the even numbered stages of the register. Each stage, that is, both even and odd numbered stages of the shift registers, are coupled to a photo-diode, thus the photodiode array 10 of FIG. 1 is illustrated as diodes $D_1$ through $D_7$ in FIG. 3. The semiconductpr photosensing devices $D_1$ through $D_7$ and the semiconductor shift register $S_1$ through $S_7$ are all preferably formed in a single chip with the active part of the elements of the photo-sensing array in one area of the chip and with the main elements of the odd numbered stages of the shift register on one side of this area and the main elements of the even numbered stages of the shift register on the other side of the area.

When a start signal is applied on lead 64 to stage $S_1$ it causes diode $D_1$ to be charged and this charging current is noted on the video output line and, of course, is a function of the incident light on diode $D_1$. The interconnection between stage $S_1$ and diode $D_1$ is illustrated as lead 69. When a timing signal $\phi_1$ is received by stage $S_1$, the bit originally supplied to stage $S_1$, is shifted via lead 70 to stage $S_2$ and when this occurs, diode $D_1$ is charged and the charging current noted on the video line. Upon the receipt of a timing signal $\phi_2$ on lead 68, the bit is then shifted to stage $S_3$ and the scan continues through the remainder of the odd numbered and even numbered stages. It should be noted that the lead 70 is disposed between the diodes $D_1$ and $D_2$ and that with the configuration illustrated in FIG. 3 there is a perfect symmetry in the lead lengths of the various leads interconnecting the odd numbered stages and even numbered stages and the diodes in the array. It is this symmetry of layout, along with the fact that the high level signals on leads 67 and 69 are generated on the same chip, that permit near perfect balanced operation between the odd numbered stages and even numbered stages in the array.

Referring again to FIG. 1, lead 70 of FIG. 3 is illustrated in FIG. 1 as leads 36, 37 and 38. Lead 72 of FIG. 3 is illustrated as leads 42, 43 and 44 in FIG. 1. Lead 36 couples the first stage of shift register 15 to the NOR gate 17, while lead 37 carries this coupling after NOR gate 17 to one of the switches within switches 13. Lead 38 connects the output from this switch to register 16. In a like manner lead 42 couples register 16 (stage $S_2$) to NOR gate 18, while lead 43 couples the NOR gate to a switch in switches 14. Lead 44 couples the switch to register 15 (stage $S_3$). Thus, each odd numbered stage is coupled to NOR gate 17 and a switch in switches 13 while each even numbered stage is coupled to the NOR gate 18 and a switch in switches 14.

Referring again to FIG. 1, the stop scan generator 26 in conjunction with the switches 13 and 14 allow the photodiode array 10 to be utilized as a variable length array. The switches which are connected to the NOR gates include, for example, a switch which is coupled to leads 37 and 38 and likewise a switch coupled to leads 43 and 44. These switches are all in the normally off mode. The leads 36, 37 and 38 are one electrically continuous interconnection between registers 15 and 16. In the NOR gates 17 and 18 this interconnection activates the NOR gates while in switch 13 there is a normally open switch between this interconnection and a common line which is activated by signal on lead 27. Upon receipt of a signal on lead 27 all the switches are switched to a common, ground, discharge mode of another potential such that any data bit in the registers will be lost, thus, terminating the scan. The switches 13 and 14 will remain in the grounded or on condition until a new start signal is generated on lead 12. Thus, the stop scan generator 26 may be an ordinary flip-flop which has lead 33 coupled to the $S_D$ terminal and which is reset at the same time a start signal is received on lead 12 (which is coupled to $C_D$). An externally controlled counting means or command means, not illustrated, may be utilized to count or determine the position of the data bit within the shift registers 15 and 16. This means may be used to terminate the scan at any predetermined point in the photo-diode array 10. The utilization of this feature permits a single photo-diode array 10 having a predetermined number of element to be used in application where fewer elements are required.

Thus, an improved photo-diode array has been disclosed which includes a shift counter to prevent a start signal from being applied to the scan generator when a scan is in process. Additionally, the array, by the incorporation of a multi-phase generator and driver on the chip which includes the photo-diodes and with the symmetry discussed and illustrated particularly in conjunction with FIG. 3, eliminates the undesirable fixed pattern noise in the video output due to the asymmetry in the clock lines or in the adjacent stages of the shift register. The array through the incorporation of switches between each stage, that is, between the odd and even stages of each of the stages in the shift register permits a scan to be terminated at any desirable point in the array hence the array may be said to have a variable length.

We claim:

1. A self-scanning photo-sensor array comprising:

a plurality of photo-sensing devices;

a scan generator cooperatively coupled to said devices for scanning said devices, said generator including means for receiving a start signal and means for preventing a start signal from being applied to said generator when said generator is scanning said devices;

whereby a video output signal from said devices shall be representative of a scan of said devices since only a single scan will be occurring at a given time.

2. The array defined in claim 1 wherein said photosensing devices comprise a row of photo-diodes.

3. The array defined in claim 2 wherein said scan generator includes a shift register.

4. The array defined in claim 3 wherein said scan generator comprises a shift register and a NOR gate, said gate being disposed between said shift register and said row of photo-diodes.

5. The array defined in claim 4 wherein said scan generator and row of photo-diodes comprise MOS devices.

6. A self-scanning photo-sensor array comprising:
a row of photo-sensing devices;
a scan generator for scanning said devices said scan generator comprising a plurality of shift register stages, said stages being coupled to said photo-sensing devices for accessing said devices; and
a plurality of NOR gates coupled between said scan generator and photo-sensing devices, said NOR gates providing an output signal when said row of photo-sensing devices are being accessed by said scan generator, said output signal being adapted to prevent the entry of any additional signals into said scan generator;
whereby a video output signal from said photo-sensing devices is representative of the incident light on said photo-sensing devices and a further start signal may not be entered into said scan generator until said accessing of said photo-sensing device is complete.

7. The array defined in claim 6 wherein the even numbered stages of said generator are disposed on one side of said row of devices and the odd numbered stages of the scan generator are disposed on the other side of said row of devices.

8. The array defined in claim 7 wherein said photo-sensing devices comprise photo-diodes.

9. The array defined in claim 8 including leads disposed between said diodes to interconnect the odd and even numbered stages of said scan generator.

10. The array defined in claim 9 including means for preventing a start signal from being applied to said generator when a scan is occurring, said means coupled to said NOR gates, and said NOR gates disposed between said stages of said shift register and said row of photo-diodes, and wherein all of said devices, gates, means and generator are MOS devices.

11. The array defined in claim 10 wherein said scan generator, NOR gates and said row of photo-diodes comprise MOS devices and are all fabricated on a single chip.

12. The array defined in claim 11 including means for receiving a low level timing signal and for generating a high level timing signal for controlling the rate at which said shift register scans said photo-diodes, said means being incorporated on the said single chip.

13. A self-scanning photo-sensor array comprising:
a row of photo-sensing devices;
a scan generator including a shift register cooperatively coupled to said devices for scanning said devices;
logic means for receiving a start signal and for preventing a start signal from being applied to said shift register when said generator is scanning said devices;
switching means for receiving a command signal, said switching means coupled between said row of photo-sensing devices and said shift register for causing a signal in said shift register to be lost upon the receipt of said command signal;
whereby when a command signal is applied to said switching means said scan is terminated and hence the array may be utilized as a variable length array and the scan readily terminated.

14. The array defined in claim 13 wherein said photo-sensing devices comprise photo-diodes.

15. The array defined in claim 14 wherein said photo-diodes, shift register, and switching means comprise MOS devices.

16. In a semiconductor photo-sensing array in a semiconductor chip the improvement comprising:
a plurality of semiconductor photo-sensing devices located in one area of a semiconductor chip; and
a shift register formed from semiconductor devices formed in said same chip, said register comprising a plurality of stages including even numbered stages and odd numbered stages, said odd numbered stages located on one side of said area containing said photo-sensing devices and said even numbered stages located on the other side of said area containing said photo-sensing devices, said odd and even stages interconnected and connected to said photo-sensing devices to enable said photo-sensing devices to be accessed, whereby said arrangement of said shift register stages and said array of photo-sensing devices provide symmetry which minimizes switching transients and provides a better signal to noise ratio.

* * * * *